United States Patent
Griffin

(10) Patent No.: US 10,295,011 B2
(45) Date of Patent: May 21, 2019

(54) SYSTEMS AND TUNED MAGNETIC DASHPOTS FOR USING INDUCTOR(S) IN MAGNETIC SKYHOOK DAMPER ISOLATION

(71) Applicant: The Boeing Company, Chicago, IL (US)

(72) Inventor: Steven Griffin, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/727,152

(22) Filed: Oct. 6, 2017

(65) Prior Publication Data
US 2019/0107172 A1 Apr. 11, 2019

(51) Int. Cl.
F16F 15/03 (2006.01)

(52) U.S. Cl.
CPC ............ *F16F 15/03* (2013.01); *F16F 15/035* (2013.01)

(58) Field of Classification Search
CPC .......... F16F 15/02; F16F 15/03; F16F 15/002; F16F 15/035
See application file for complete search history.

(56) References Cited

U.S. PATENT DOCUMENTS

| | | | | |
|---|---|---|---|---|
| 5,570,286 A | * | 10/1996 | Margolis | B60G 13/14 180/165 |
| 5,828,767 A | * | 10/1998 | Button | H04R 3/002 381/401 |
| 6,032,770 A | * | 3/2000 | Alcone | F16F 7/1011 188/378 |

(Continued)

FOREIGN PATENT DOCUMENTS

| | | |
|---|---|---|
| JP | H01 203730 | 8/1989 |
| WO | WO 03/060345 | 7/2003 |
| WO | WO 2006/106134 | 10/2006 |

OTHER PUBLICATIONS

Preumont, "Vibration Control of Active Structures: An Introduction" p. 114-118 (2002).

(Continued)

*Primary Examiner* — Thomas J Williams

(74) *Attorney, Agent, or Firm* — McDonnell Boehnen Hulbert & Berghoff LLP

(57) ABSTRACT

An example system for using an inductor in magnetic skyhook damper isolation includes a first component moveable with respect to a second component, and a tuned magnetic dashpot positioned between the first component and the second component. The tuned magnetic dashpot damps movement of the first component relative to the second component, and includes a voice coil coupled to the first component, a magnet coupled to the second component and concentric with the voice coil, and an inductor positioned in series with the voice coil to enable frequency dependent damping, such that damping below a critical frequency $\sqrt{2}\omega_n$ is greater than damping above the critical frequency $\sqrt{2}\omega_n$, where $\omega_n$ is a natural frequency of movement of the first component relative to the second component.

20 Claims, 6 Drawing Sheets

(56) References Cited

U.S. PATENT DOCUMENTS

| | | | |
|---|---|---|---|
| 6,315,094 B1 * | 11/2001 | Griffin | F16F 7/10 |
| | | | 188/379 |
| 6,739,425 B1 * | 5/2004 | Griffin | G10K 11/16 |
| | | | 181/171 |
| 9,587,699 B1 | 3/2017 | Griffin et al. | |
| 9,712,033 B2 * | 7/2017 | Eklund | A61M 16/20 |
| 2011/0227425 A1 | 9/2011 | Sohn | |
| 2013/0067931 A1 | 3/2013 | Hindle et al. | |

OTHER PUBLICATIONS

European Search Report prepared by the European Patent Office in application No. 18 19 4167.5 dated Feb. 26, 2019.

\* cited by examiner

200 → START
↓
COUPLING A VOICE COIL TO THE FIRST COMPONENT — 202
↓
COUPLING A MAGNET TO THE SECOND COMPONENT AND CONCENTRIC WITH THE VOICE COIL — 204
↓
POSITIONING AN INDUCTOR IN SERIES WITH THE VOICE COIL TO ENABLE FREQUENCY DEPENDENT DAMPING, SUCH THAT DAMPING BELOW A CRITICAL FREQUENCY $\sqrt{2}\omega_n$ IS GREATER THAN DAMPING ABOVE THE CRITICAL FREQUENCY $\sqrt{2}\omega_n$, WHERE $\omega_n$ IS A NATURAL FREQUENCY OF MOVEMENT OF THE FIRST COMPONENT RELATIVE TO THE SECOND COMPONENT — 206
↓
END

OPERATING THE VOICE COIL AND MAGNET TO PROVIDE A BACK ELECTROMOTIVE FORCE (EMF) FOR DAMPING MOVEMENT OF THE FIRST COMPONENT RELATIVE TO THE SECOND COMPONENT — 208

DETERMINING A VALUE OF INDUCTANCE OF THE INDUCTOR BASED ON A TRANSMISSIBILITY OF THE TUNED MAGNETIC DASHPOT GIVEN BY Y/X DETERMINED BY EQUATIONS OF MOTION AS FOLLOWS:

$$m\ddot{y} + k(y - x) = f$$

$$f = bli$$

$$bl(\dot{y} - \dot{x}) + ir + \dot{i}(l + l_{ext}) = 0$$

WHERE M IS A MASS OF THE FIRST COMPONENT, Y IS A DISPLACEMENT OF THE FIRST COMPONENT, X IS A DISPLACEMENT OF THE SECOND COMPONENT, $i$ IS CURRENT THROUGH THE INDUCTOR, F IS A FORCE EXERTED BY THE VOICE COIL, R IS A RESISTANCE OF THE VOICE COIL AND THE INDUCTOR, L IS AN INTERNAL INDUCTANCE OF THE VOICE COIL, $L_{EXT}$ IS AN INDUCTANCE OF THE INDUCTOR, BL IS A COEFFICIENT OF THE VOICE COIL FORCE, AND K IS A SPRING CONSTANT
— 210

FIG. 10

SYSTEMS AND TUNED MAGNETIC DASHPOTS FOR USING INDUCTOR(S) IN MAGNETIC SKYHOOK DAMPER ISOLATION

FIELD

The present disclosure generally relates to isolation systems to isolate two portions of a vehicle from movement incurred by one of the portions, and more particularly, to a tuned magnetic dashpot for damping movement between components.

BACKGROUND

Vibrations transmitted onto payloads in vehicles can cause problems. For example, if the vehicle is an automobile, vibrations cause discomfort. If the vehicle is a space launch vehicle, vibrations can jeopardize the mission. Thus, isolation systems are typically used to isolate a body of the vehicle from the payload to prevent transmission of the vibrations from the body to the payload.

Isolation systems are well known in the art, which include passive systems, semi-active systems, and active systems. Passive systems utilize passive isolating devices such as mounts and shock absorbers to isolate a suspended member from shock and vibration inputs. Passive systems can provide adequate isolation, but usually only dissipate energy from the system.

Semi-active systems have been developed that vary parameters of the isolation system in order to provide better isolation. For example, a semi-active system can incorporate controllable dampers for providing a controllable damper force as needed.

Active systems further control movement of the isolated member in the system by using external power. An example active system is typically used in automobile to control movement of the wheels relative to the chassis or vehicle body, rather than using passive suspension where the movement is determined entirely by the road surface.

With isolation systems, skyhook theory is an idea that all isolation systems are designed to achieve (whether passive, semi-active, or active), which includes having the system maintain a stable posture as if suspended by an imaginary hook in the sky, unaffected by external conditions. Thus, it is a goal of isolation systems to achieve little or no amplification of the system at resonance by adding a force to resist movement of the system. This can be achieved with active systems by implementing a sky-hook isolator that has a feedback link established between the body of the system and the actuator force so that the active control force can be made proportional to the body velocity and that there is no amplification below $\omega_n$ (where $\omega_n$ is a natural frequency of the system where the system tends to oscillate in the absence of a damping force).

For a passive system, the skyhook design involves a trade-off between the resonance amplification and the high frequency attenuation. What is needed is a way of achieving isolation performance using passive isolation that is nearly the ideal performance of a skyhook without the need for active isolation and external power.

SUMMARY

In one example, a tuned magnetic dashpot for damping movement of a first component relative to a second component is described. The tuned magnetic dashpot comprises a voice coil coupled to the first component, a magnet coupled to the second component and concentric with the voice coil, and an inductor positioned in series with the voice coil to enable frequency dependent damping, such that damping below a critical frequency $\sqrt{2}\omega_n$ is greater than damping above the critical frequency $\sqrt{2}\omega_n$, where $\omega_n$ is a natural frequency of movement of the first component relative to the second component.

In another example, a system is described that includes a first component moveable with respect to a second component, and a tuned magnetic dashpot positioned between the first component and the second component. The tuned magnetic dashpot is for damping movement of the first component relative to the second component. The tuned magnetic dashpot includes a voice coil coupled to the first component, a magnet coupled to the second component and concentric with the voice coil, and an inductor positioned in series with the voice coil to enable frequency dependent damping, such that damping below a critical frequency $\sqrt{2}\omega_n$ is greater than damping above the critical frequency $\sqrt{2}\omega_n$, where $\omega_n$ is a natural frequency of movement of the first component relative to the second component.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

FIG. 8 shows a flowchart of an example method for damping movement of the first component relative to the second component, according to an example embodiment.

FIG. 9 shows a flowchart of an example method for use with the method, according to an example embodiment.

FIG. 10 shows a flowchart of an example method for use with the method, according to an example embodiment.

DETAILED DESCRIPTION

Disclosed embodiments will now be described more fully hereinafter with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Figure 1:
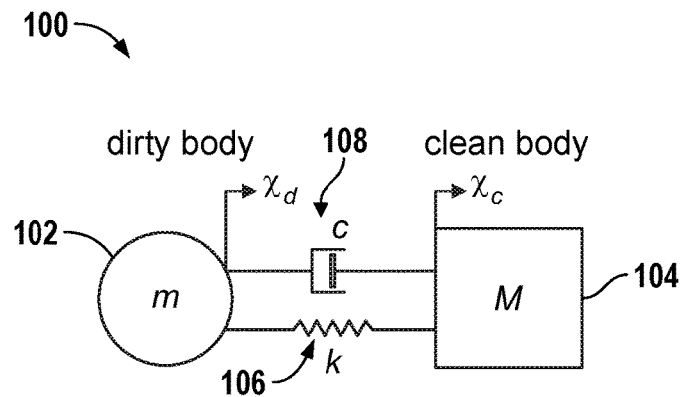
FIG. 1 is an example illustration of a system in which a disturbance force is generated and damped, according to an example implementation.

It is a goal of active isolation systems to achieve little or no amplification at resonance. FIG. 1 is an example illustration of a system 100 in which a disturbance force is generated and damped, according to an example implementation. The system 100 includes a first mass 102 coupled to a second mass 104 via a spring 106 and a dashpot 108. The first mass 102 causes a displacement $x_d$ of a supporting structure (e.g., dirty body) and the system output is a displacement $x_c$ of the second mass 104 (e.g., clean body). The spring 106 and the dashpot 108 operate to damp the disturbance some amount, and a transmissibility of the system 100 (defined in terms of a function between displacement of the dirty body or the first mass 102 and that of the clean body or second mass 104) can be determined as $x_c/x_d$.

Figure 2:
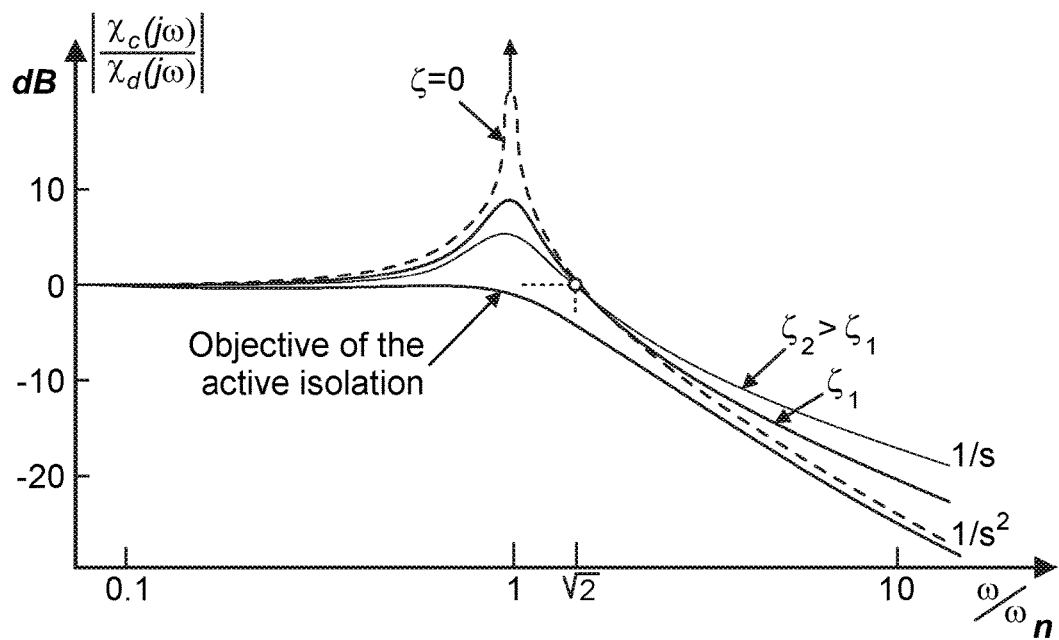
FIG. 2 is an example plot illustrating transmissibility of an example passive isolator, such as the system shown in FIG. 1, for various values of damping $\xi$, according to an example implementation.

FIG. 2 is an example plot illustrating transmissibility of an example passive isolator, such as the system 100 shown in FIG. 1, for various values of damping according to an example implementation. FIG. 2 illustrates a curve for an objective of an example active isolation as well in which no amplification occurs below 1 Hz, and above 1 Hz, attenuation begins.

As shown in FIG. 2, all curves for the example passive isolator are larger than 1 Hz for $\omega<\sqrt{2}\omega_n$, and become smaller than 1 Hz for $\omega>\sqrt{2}\omega_n$. Thus, a critical frequency $\sqrt{2}\omega_n$ separates domains of amplification and attenuation of the system.

When $\xi=0$, a high frequency decay rate is $1/s^2$, that is −40 dB/decade, while very large amplitudes occur near a corner frequency $\omega_n$ (the natural frequency of the spring-mass system). Damping then reduces the amplitude at resonance, but also tends to reduce effectiveness at high frequency as the high frequency decay rate becomes $1/s$ (−20 dB/decade).

A design of a passive isolator involves a trade-off between the resonance amplification and the high frequency attenuation. An ideal isolator may have a frequency dependent damping, with high damping below the critical frequency $\sqrt{2}\omega_n$ (where $\omega_n$ is a natural frequency of movement of components) to reduce the amplification peak, and low damping above $\sqrt{2}\omega_n$ to improve a decay rate. An objective in designing an active isolation system is generally to add a force actuator working in parallel with a spring and dashpot, which will operate in such a way that there is no amplification below $\omega_n$ and a decay rate is −40 dB/decade at high frequency (e.g., as shown by the dotted line in FIG. 2).

An ability to achieve high damping at resonance without sacrificing $1/s^2$ rolloff (in Laplace domain or $1/\omega^2$ in time domain), as shown in FIG. 2, is referred to as skyhook damping. Skyhook damping refers to maintaining stability in a system as if suspended by an imaginary hook in the sky, and thus if a damper were attached to an inertial reference that followed the payload around (a skyhook), high damping at resonance without sacrificing $1/s^2$ rolloff can be achieved.

Active isolation techniques are often designed to achieve skyhook damping with added complexity of a feedback control system and a need for external power. Within examples described herein, systems and methods for achieving isolation performance that is nearly ideal are described without the need for active isolation. The new approach can be made entirely passive, and does not require external power, for example.

In some examples herein, methods of achieving vibration isolation performance nearly as good as from active isolation are shown with use of a voice coil/magnetic dashpot and an external inductor. An example passive isolator is thus capable of achieving skyhook damping at high frequencies without a need any external power sources.

Figure 3:
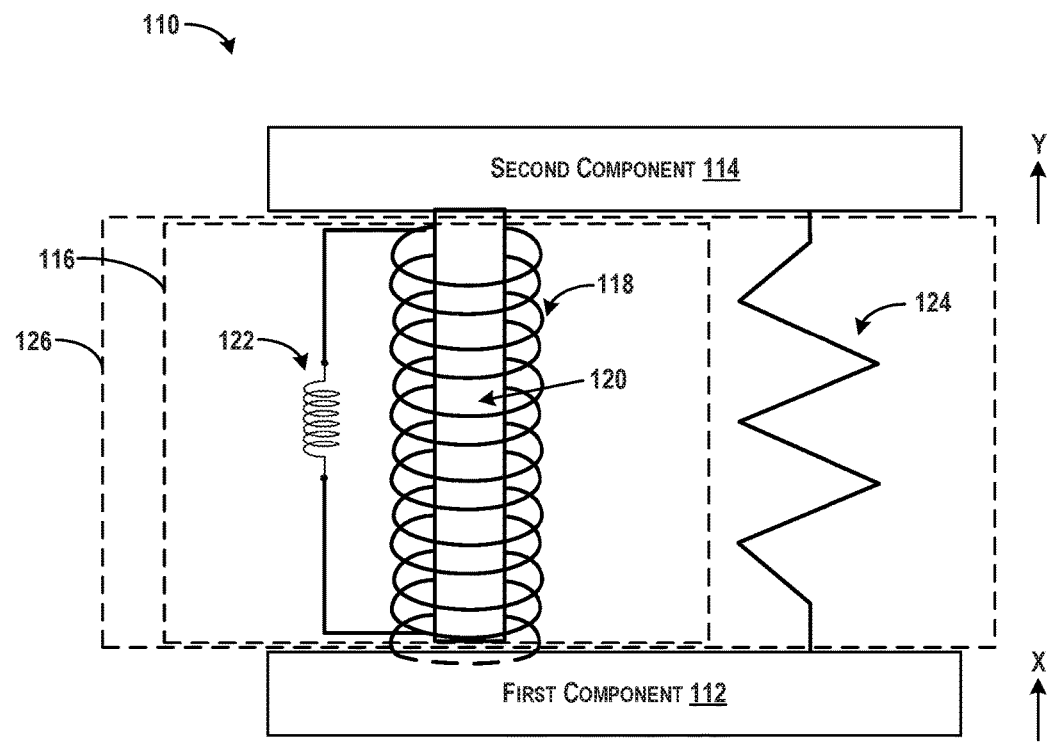
FIG. 3 illustrates an example system that uses inductor(s) in magnetic skyhook damper isolation, according to an example implementation.

FIG. 3 illustrates an example system 110 that uses inductor(s) in magnetic skyhook damper isolation, according to an example implementation. The system 110 includes a first component 112 moveable with respect to a second component 114, and a tuned magnetic dashpot 116 positioned between the first component 112 and the second component 114. The tuned magnetic dashpot 116 damps movement of the first component 112 relative to the second component 114. For example, the first component 112 may be a base and the second component 114 may be a payload positioned on the base. As a result, movement/vibrations of the first component 112 are translated to the second component 114, and the tuned magnetic dashpot 116 operates to attenuate those vibrations that may be translated to the second component 114, for example.

In a specific example, the first component 112 includes a frame of a vehicle and the second component 114 includes a body attached to the frame that would otherwise experience the same vibrations as experienced by the first component 112 if not for the tuned magnetic dashpot 116 positioned between the first component 112 and the second component 114 that attenuates vibrations experienced by the first component 112 relative to the second component 114.

The tuned magnetic dashpot 116 includes a voice coil 118 coupled to the first component 112, a magnet 120 coupled to the second component 114 and concentric with the voice coil 118, and an inductor 122 positioned in series with the voice coil 118 to enable frequency dependent damping, such that damping below a critical frequency $\sqrt{2}\omega_n$ is greater than damping above the critical frequency $\sqrt{2}\omega_n$, and $\omega_n$ is a natural frequency of movement of the first component 112 relative to the second component 114.

The voice coil 118 may be physically connected to or affixed to the first component 112, and the magnet 120 may be physically connected to or affixed to the second component 114. In other examples, the system 110 may be reversed in which the second component 114 is the base and the first component 112 is the payload, such that the voice coil 118 is physically connected or affixed to the first component 112 (payload) and the magnet 120 is physically connected or affixed to the second component 114 (base).

The system 110 also includes a spring 124 that extends between the first component 112 and the second component 114 to control relative positioning of the first component 112 to the second component 114. The spring 124 acts to further attenuate vibrations experienced by the first component 112 relative to the second component 114.

The tuned magnetic dashpot 116 can further include a frame 126, and the voice coil 118 can be supported in the frame 126, the magnet 120 is movable relative to the frame 126 via the voice coil 118, and the inductor 122 can be positioned in the frame 126.

The magnet 120 of the tuned magnetic dashpot 116 provides a moving mass for the tuned magnetic dashpot 116 that reciprocates concentrically within the voice coil 118. The voice coil 118 is not actively powered to move the magnet 120 up or down from a neutral position, and thus, the tuned magnetic dashpot 116 uses no external power source. Rather passive isolation is used such that energy experienced by the first component 112 is dissipated by the tuned magnetic dashpot 116. For example, a velocity of the magnet 120 (due to motion of the second component 114 to which the magnet is affixed) in a vicinity of the voice coil 118 produces back electromotive force in the voice coil 118. If the voice coil 118 is shorted, an effective damping coefficient is $$\frac{bl^2}{r},$$

where bl is the voice coil force coefficient that relates force to applied current and r is a resistance of the voice coil 118 and the wire that shorts the voice coil 118.

As shown in FIG. 3, when using the voice coil 118 and the magnet 120 combination in parallel with the spring 124, the voice coil 118 and the magnet 120 combination can be used as a dashpot that absorbs energy and limits a response at resonance.

In FIG. 2, a passive isolation system designed with a voice coil dashpot would behave either like the line labelled $\xi_1$ or $\xi_2$ with an amplitude at resonance determined by the damping coefficient, which depends on a strength of the voice coil force coefficient. While the more damped curve corresponding to $\xi_2$ has a lower amplitude at resonance, the behavior above $\sqrt{2}\omega_n$ is degraded with roll off approaching 1/s. Since a goal of an isolation system is a roll off of $1/s^2$, a high voice coil force coefficient damper may not be able to achieve this goal.

For example, in existing voice coil/magnet systems, the magnet moves relative to the voice coil to induce current in the voice coil and the current is dissipated by resistance of the voice coil that looks like damping to an external mechanical system. Such systems work at low frequencies, but operation begins to degrade between 200 Hz-500 Hz and attenuation discontinues at about 500 Hz.

Within examples described herein, rather than shorting the voice coil 118, the tuned magnetic dashpot 116 uses the inductor 122 in series with the voice coil 118, which acts to decrease its performance as a dashpot at high frequencies. A value of the inductor 122 is selected in a deterministic manner to control where the tuned magnetic dashpot 116 stops attenuation to achieve skyhook damping.

The tuned magnetic dashpot 116 has an amount of passive inductance in the voice coil 118, and a transition frequency where damping decreases significantly is in the 100's of Hz, which is much higher than a desired isolation frequency of most systems. The addition of external inductance (e.g., the inductor 122) in series with the voice coil 118 and tuning a value of the inductor 122 enable a much lower transition frequency to be achieved. The addition of the inductor 122 that is tunable thus can achieve frequency dependent damping, with high damping below the critical frequency $\sqrt{2}\omega_n$ and low damping above the critical frequency $\sqrt{2}\omega_n$. Thus, in operation, the inductor 122 reduces an amplitude of displacement of the first component 112 relative to the second component 114 at resonance.

FIG. 3 illustrates one inductor in series with the voice coil 118, however, more than one inductor may be used. The inductor 122 may also be a tunable or variable inductor, as described below.

In addition, the system 110 in FIG. 3 illustrates one tuned magnetic dashpot 116 for a one-degree-of-freedom isolator, although additional dampers may be included. For example, the system 110 may include a plurality of tuned magnetic dashpots arranged in a hexapod for a six-degree-of-freedom isolator.

Figure 4:
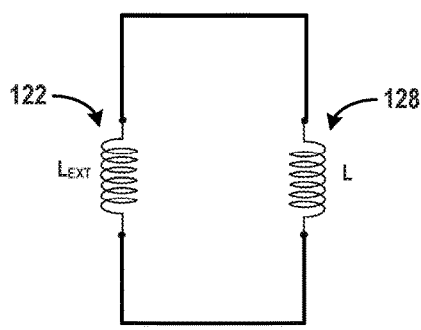
FIG. 4 is a schematic diagram illustrating inductance in the tuned magnetic dashpot, according to an example implementation.

FIG. 4 is a schematic diagram illustrating inductance in the tuned magnetic dashpot 116, according to an example implementation. The voice coil 118 has an inherent inductance 128, which is shown to be in series with externally added inductance due to the inductor 122. The voice coil 118 and the magnet 120 operate to provide a back electromotive force (EMF) for damping movement of the first component 112 relative to the second component 114, and the inductor 122 is thus an additional inductance added in series with the voice coil 118 to modify the back EMF provided at certain frequencies.

Figure 5:
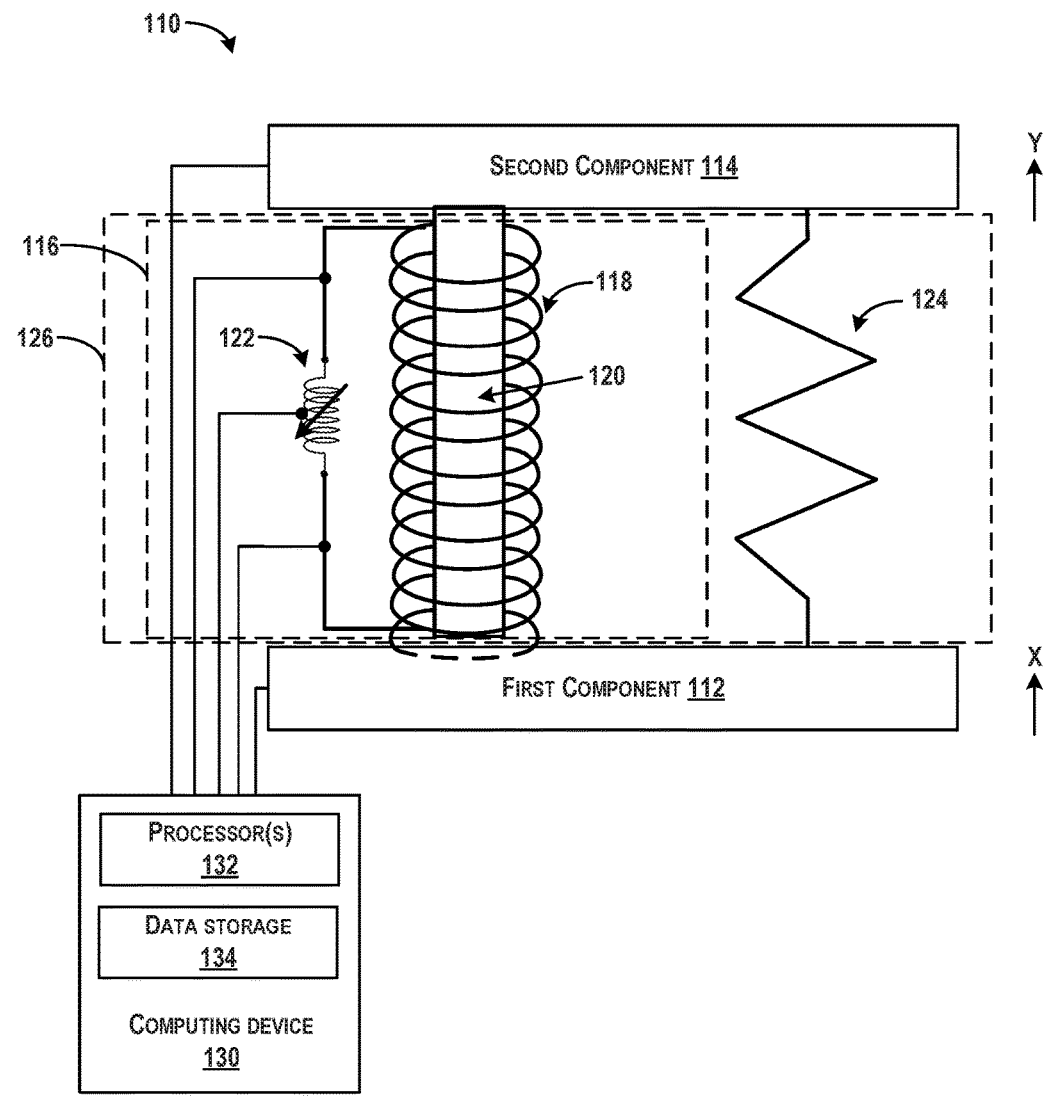
FIG. 5 illustrates the example system with inductor tuning functionality, according to an example implementation.

FIG. 5 illustrates the example system 110 with inductor tuning functionality, according to an example implementation. In FIG. 5, a computing device 130 includes one or more processor(s) 132 that is coupled to the first component 112, the second component 114, the inductor 122 and wires connecting the inductor 122 to the voice coil 118.

The inductance of the inductor 122 is based on a shut-off frequency of the tuned magnetic dashpot 116, such that above the shut-off frequency, the tuned magnetic dashpot 116 provides approximately no damping of movement of the first component 112 relative to the second component 114. The voice coil 118 has the inherent inductance bl, and a value of the inductor 122 can be tuned to achieve a desired shut-off frequency where attenuation discontinues. The computing device 130 receives feedback of movement or displacement of the first component 112 and the second component 114, and adjusts a value of the inductor 122 accordingly.

The processor(s) 132 may be a general-purpose processor or a special purpose processor (e.g., digital signal processors, application specific integrated circuits, etc.). The processor(s) 132 can be configured to execute program instructions (e.g., computer-readable program instructions) that are stored in data storage 134 and executable to provide functionality of determining a value of the inductor 122 described herein. The data storage 134 may include or take the form of one or more computer-readable storage media that can be read or accessed by the processor(s) 132. The computer-readable storage media can include volatile and/or non-volatile storage components, such as optical, magnetic, organic or other memory or disc storage, which can be integrated in whole or in part with the processor(s) 132. The data storage 134 is considered non-transitory computer readable media.

To determine a value of the inductor 122, a transmissibility of the tuned magnetic dashpot 116 may be analyzed, which is given by y/x as determined by equations of motion as follows:

$$m\ddot{y}+k(y-x)=f$$

$$f=bli$$

$$bl(\dot{y}-\dot{x})+ir+i(l+l_{ext})=0$$

where m is a mass of the first component 112, y is a displacement of the first component 112, x is a displacement of the second component 114, i is current through the inductor 122, f is a force exerted by the voice coil 118, r is a resistance of the voice coil 118 and the inductor 122, l is an internal inductance of the voice coil 118, $l_{ext}$ is an inductance of the inductor 122, bl is a coefficient of the voice coil force, and k is a spring constant. Solving these three equations for the transmissibility y/x as desired results in a determined value of the inductor 122 (e.g., $l_{ext}$).

Figure 6:
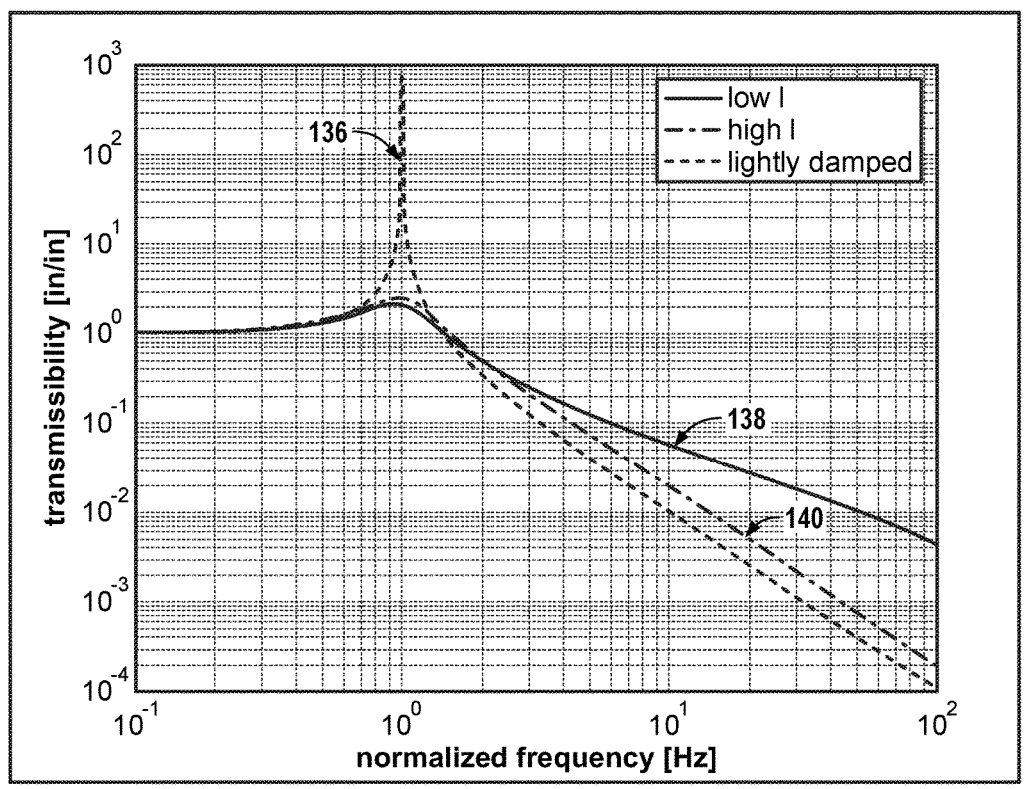
FIG. 6 is an example plot illustrating transmissibility of the tuned magnetic dashpot, for various values of damping $\xi$, according to an example implementation.

FIG. 6 is an example plot illustrating transmissibility of the tuned magnetic dashpot 116, for various values of damping according to an example implementation.

In one example, a lightly damped isolator with very small may be produced (which matches=0 curve in FIG. 2) and exhibits $1/s^2$ roll off, as shown by curve 136. In another example, a shorted dashpot with relatively high damping and roll off approaching 1/s, may be produced, as shown by curve 138.

However, by tuning the inductor 122, a dashpot with external inductance (e.g., value of the inductor 122 ($l_{ext}$)) of about sixty (60) times the inherent/internal inductance of the voice coil 118 may be achieved, as shown by curve 140. The curve 140 has a very small increase in amplitude at resonance as compared to the curve 138 (e.g., about 20% increase), but experiences a 66% decrease in transmissibility at ten (10) times the isolator frequency as compared to the curve 138. The line roll off of the curve 140 also closely matches the desired $1/s^2$ roll off of the curve 136 with performance increasing as compared to the curve 138 as frequency increases.

Thus, the tuned magnetic dashpot 116 with external inductance (e.g., the curve 140) achieves desired performance characteristics of the lightly damped isolator (represented by the curve 136) at roll off, while also achieving desired performance characteristics of the shorted dashpot (represented by the curve 138) at resonance. In some examples, by tuning the inductor 122, high damping is achieved below the critical frequency $\sqrt{2}\omega_n$ (where $\omega_n$ is a natural frequency of movement of components) to reduce the amplification peak as seen by a traditional isolator (represented by the curve 136), and low damping is achieved above $\sqrt{2}\omega_n$ to improve a decay rate as seen by the shorted dashpot (represented by the curve 138).

Inductance values of the inductor 122 can be tuned until performance is seen by the tuned magnetic dashpot 116 that matches or closely resembles that as seen by the curve 140. In one example, the inductance of the inductor 122 can be selected to be approximately sixty (60) times the inherent inductance of the voice coil 118.

Use of an external inductance in the tuned magnetic dashpot 116 improves performance of the isolator, and enables a tunable isolator to achieve lower amplitude at resonance and/or improved isolator performance.

Figure 7:
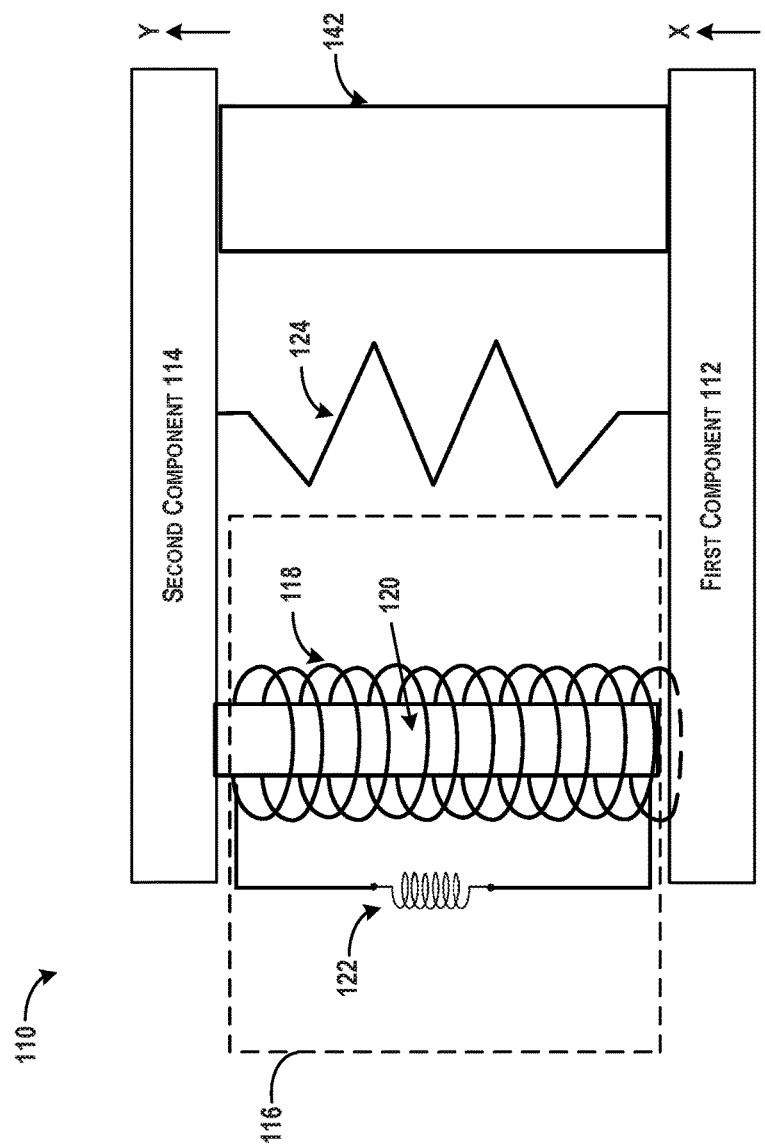
FIG. 7 illustrates the example system with an active isolation system positioned between the first component and the second component, according to an example implementation.

FIG. 7 illustrates the example system 110 with an active isolation system 142 positioned between the first component 112 and the second component 114, according to an example implementation. The active isolation system 142 may be operated in parallel with the tuned magnetic dashpot 116. In FIG. 7, the tuned magnetic dashpot 116 may then be a backup damping system, for example.

FIG. 8 shows a flowchart of an example method 200 for damping movement of the first component 112 relative to the second component 114, according to an example embodiment. Method 200 shown in FIG. 8 presents an embodiment of a method that, for example, could be used with the system 110 as shown and described herein, for example. It should be understood that for this and other processes and methods disclosed herein, flowcharts show functionality and operation of one possible implementation of present embodiments. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, any of the blocks may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, blocks in FIG. 8, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes coupling the voice coil 118 to the first component 112. At block 204 the method 200 includes coupling the magnet 120 to the second component 114 and concentric with the voice coil 118. At block 206, the method includes positioning the inductor 122 in series with the voice coil 118 to enable frequency dependent damping, such that damping below a critical frequency $\sqrt{2}\omega_n$ is greater than damping above the critical frequency $\sqrt{2}\omega_n$, where $\omega_n$ is a natural frequency of movement of the first component relative to the second component.

FIG. 9 shows a flowchart of an example method for use with the method 200, according to an example embodiment. At block 208, functions include operating the voice coil 118 and the magnet 120 to provide a back electromotive force (EMF) for damping movement of the first component 112 relative to the second component 114, and the inductor 122 is an additional inductance added in series with the voice coil 118 to modify the back EMF provided at certain frequencies.

FIG. 10 shows a flowchart of an example method for use with the method 200, according to an example embodiment. At block 210, functions include determining a value of inductance of the inductor 122 based on a transmissibility of the tuned magnetic dashpot 116 given by y/x determined by equations of motion as follows:

$$m\ddot{y}+k(y-x)=f$$

$$f=bli$$

$$bl(\dot{y}-\dot{x})+ir+i(l+l_{ext})=0$$

where m is a mass of the first component 112, y is a displacement of the first component 112, x is a displacement of the second component 114, i is current through the inductor 122, f is a force exerted by the voice coil 118, r is a resistance of the voice coil 118 and the inductor 122, l is an internal inductance of the voice coil 118, $l_{ext}$ is an inductance of the inductor 122, bl is a coefficient of the voice coil force, and k is a spring constant.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A tuned magnetic dashpot for damping movement of a first component relative to a second component, the tuned magnetic dashpot comprising:
   a voice coil coupled to the first component;
   a magnet coupled to the second component and concentric with the voice coil; and
   an inductor positioned in series with the voice coil to enable frequency dependent damping, such that damping below a critical frequency $\sqrt{2}\omega_n$ is greater than damping above the critical frequency $\sqrt{2}\omega_n$, where $\omega_n$ is a natural frequency of movement of the first component relative to the second component,
   wherein the voice coil has an inherent inductance and wherein the voice coil and the magnet operate to provide a back electromotive force (EMF) for damping movement of the first component relative to the second component,
   wherein the inductor is an additional inductance added in series with the voice coil to modify the back EMF provided at certain frequencies, and
   wherein an inductance of the inductor is based on a shut-off frequency of the tuned magnetic dashpot, wherein above the shut-off frequency, the tuned magnetic dashpot provides approximately no damping of movement of the first component relative to the second component.

2. The tuned magnetic dashpot of claim 1, wherein the tuned magnetic dashpot uses no external power source.

3. The tuned magnetic dashpot of claim 1, wherein the inductor has an inductance of approximately 60 times the inherent inductance of the voice coil.

4. The tuned magnetic dashpot of claim 1, further comprising a frame, wherein:
   the voice coil is supported in the frame;
   the magnet is movable relative to the frame via the voice coil; and
   the inductor is positioned in the frame.

5. The tuned magnetic dashpot of claim 1, wherein a spring extends between the first component and the second component to control relative positioning of the first component to the second component.

6. The tuned magnetic dashpot of claim 5, wherein a transmissibility of the tuned magnetic dashpot is given by y/x determined by equations of motion as follows:

$$m\ddot{y}+k(y-x)=f$$

$$f=bli$$

$$bl(\dot{y}-\dot{x})+ir+i(l+l_{ext})=0$$

where m is a mass of the first component, y is a displacement of the first component, x is a displacement of the second component, i is current, f is a force exerted by the voice coil, r is a resistance of the voice coil and the inductor, l is an internal inductance of the voice coil, $l_{ext}$ is an inductance of the inductor, bl is a coefficient of the voice coil force, and k is a spring constant.

7. The tuned magnetic dashpot of claim 6, wherein the inductor reduces an amplitude of displacement of the first component at resonance.

8. A system, comprising:
   a first component moveable with respect to a second component; and
   a tuned magnetic dashpot positioned between the first component and the second component, the tuned magnetic dashpot for damping movement of the first component relative to the second component, the tuned magnetic dashpot including:
   a voice coil coupled to the first component;
   a magnet coupled to the second component and concentric with the voice coil; and
   an inductor positioned in series with the voice coil to enable frequency dependent damping, such that damping below a critical frequency $\sqrt{2}\omega_n$ is greater than damping above the critical frequency $\sqrt{2}\omega_n$, where $\omega_n$ is a natural frequency of movement of the first component relative to the second component,
   wherein the voice coil has an inherent inductance and wherein the voice coil and the magnet operate to provide a back electromotive force (EMF) for damping movement of the first component relative to the second component, wherein the inductor is an additional inductance added in series with the voice coil to modify the back EMF provided at certain frequencies, and wherein an inductance of the inductor is based on a shut-off frequency of the tuned magnetic dashpot, wherein above the shut-off frequency, the tuned magnetic dashpot provides approximately no damping of movement of the first component relative to the second component.

9. The system of claim 8, further comprising a plurality of tuned magnetic dashpots arranged in a hexapod.

10. The system of claim 8, wherein the tuned magnetic dashpot uses no external power source.

11. The system of claim 8, wherein a spring extends between the first component and the second component to control relative positioning of the first component to the second component.

12. The system of claim 11, wherein a transmissibility of the tuned magnetic dashpot is given by y/x determined by equations of motion as follows:

$$m\ddot{y}|k(y\ x)=f$$

$$f=bli$$

$$bl(\dot{y}-\dot{x})+ir+i(l+l_{ext})=0$$

where m is a mass of the first component, y is a displacement of the first component, x is a displacement of the second component, i is current through the inductor, f is a force exerted by the voice coil, r is a resistance of the voice coil and the inductor, l is an internal inductance of the voice coil, $l_{ext}$ is an inductance of the inductor, bl is a coefficient of the voice coil force, and k is a spring constant.

13. The system of claim 12, wherein the inductor reduces an amplitude of displacement of the first component at resonance.

14. The system of claim 8, wherein the inductor has an inductance of approximately 60 times the inherent inductance of the voice coil.

15. The system of claim 8, wherein the tuned magnetic dashpot further includes a frame, and wherein:
the voice coil is supported in the frame;
the magnet is movable relative to the frame via the voice coil; and
the inductor is positioned in the frame.

16. The system of claim 8, further comprising:
an active isolation system positioned between the first component and the second component, the active isolation system operated in parallel with the tuned magnetic dashpot.

17. A tuned magnetic dashpot for damping movement of a first component relative to a second component, the tuned magnetic dashpot comprising:
a voice coil coupled to the first component;
a magnet coupled to the second component and concentric with the voice coil; and
an inductor positioned in series with the voice coil to enable frequency dependent damping, such that damping below a critical frequency $\sqrt{2}\omega_n$ is greater than damping above the critical frequency $\sqrt{2}\omega_n$, where $\omega_n$ is a natural frequency of movement of the first component relative to the second component,
wherein the voice coil has an inherent inductance and wherein the inductor has an inductance of approximately 60 times the inherent inductance of the voice coil.

18. The tuned magnetic dashpot of claim 17, wherein the tuned magnetic dashpot uses no external power source.

19. The tuned magnetic dashpot of claim 17, wherein a spring extends between the first component and the second component to control relative positioning of the first component to the second component.

20. The tuned magnetic dashpot of claim 17, further comprising a frame, wherein:
the voice coil is supported in the frame;
the magnet is movable relative to the frame via the voice coil; and
the inductor is positioned in the frame.

\* \* \* \* \*